United States Patent
Rajsic et al.

(10) Patent No.: US 9,106,618 B2
(45) Date of Patent: Aug. 11, 2015

(54) CONTROL PLANE ENCRYPTION IN IP/MPLS NETWORKS

(71) Applicants: Carl Rajsic, Ottawa (CA); Hansen Chan, Ottawa (CA)

(72) Inventors: Carl Rajsic, Ottawa (CA); Hansen Chan, Ottawa (CA)

(73) Assignee: Alcatel Lucent, Boulogne-Billancourt (FR)

( * ) Notice: Subject to any disclaimer, the term of this patent is extended or adjusted under 35 U.S.C. 154(b) by 89 days.

(21) Appl. No.: 13/748,244

(22) Filed: Jan. 23, 2013

(65) Prior Publication Data
US 2014/0208094 A1    Jul. 24, 2014

(51) Int. Cl.
    *H04L 29/06*    (2006.01)
(52) U.S. Cl.
    CPC .......... *H04L 63/0428* (2013.01); *H04L 63/166* (2013.01)
(58) Field of Classification Search
    CPC ..... H04L 63/0428; H04L 12/58; H04L 29/06; H04L 63/04; H04L 63/08
    USPC ......................................................... 713/152
    See application file for complete search history.

(56) References Cited

U.S. PATENT DOCUMENTS

| | | | |
|---|---|---|---|
| 7,398,386 B2 * | 7/2008 | Kessler et al. | ................. 713/150 |
| 7,526,658 B1 | 4/2009 | He et al. | |
| 8,284,943 B2 | 10/2012 | Carrasco | |
| 8,307,423 B2 * | 11/2012 | Wainner et al. | ................. 726/15 |
| 2006/0184789 A1 * | 8/2006 | Karasawa et al. | ............. 713/160 |
| 2012/0011351 A1 * | 1/2012 | Mundra et al. | ................... 713/1 |

OTHER PUBLICATIONS 350.2-G-0%20Encryption%20Algorithm%20Trade%20SurveyRev1[1],Jul. 2007, p. 14, Table 3-1.*
2_p2pGRE_Phase2.pdf, http://www.cisco.com/c/en/us/td/docs/solutions/Enterprise/WAN_and_MAN/P2P_GRE_IPSec/P2P_GRE_IPSec/2_p2pGRE_Phase2.pdf, Chapter 2, Cisco, 2006.*
5_p2pGRE.pdf, http://www.cisco.com/c/en/us/td/docs/solutions/Enterprise/WAN_and_MAN/P2P_GRE_IPSec/P2P_GRE_IPSec/5_p2pGRE.pdf, Chapter 5, Cisco, 2006.*
Notification of Transmittal of the International Search Report and the Written Opinion of the International Searching Authority, or the Declaration issued in PCT/CA2014/050045.
Lin, et al., "Security Research of VPN Technology Based on MPLS", Proceedings of the Third International Symposium on Computer Science and Computational Technology (ISCSCT '10), Aug. 14, 2010, 168-170.

* cited by examiner

*Primary Examiner* — Michael Chao
*Assistant Examiner* — Shu Chun Gao
(74) *Attorney, Agent, or Firm* — Kramer & Amado, P.C.

(57) ABSTRACT

A method for providing control plane encryption in layer 3 networks is disclosed. The method for providing control plane encryption in layer 3 networks includes for a network having a subset of network elements forming a secured domain; the steps of at a network element which is in the secured domain, encrypting all unencrypted Layer 3 packets as they egress an encryption enable egress interface; unencrypting all encrypted Layer 3 packets as they egress an egress interface is not enabled for encryption; and leaving encrypted all encrypted Layer 3 packets as they egress an encryption enable egress interface. A system and machine readable storage media are also disclosed.

6 Claims, 4 Drawing Sheets

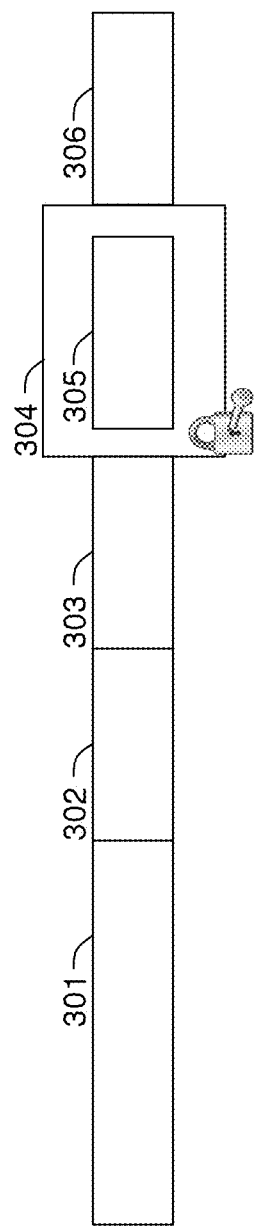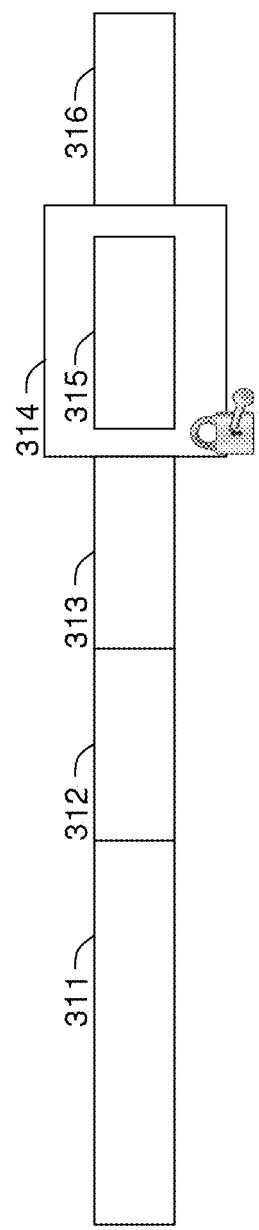

CONTROL PLANE ENCRYPTION IN IP/MPLS NETWORKS

FIELD OF THE INVENTION

The invention relates to the use of encryption of network traffic, and in particular to encryption of all user and control plane traffic traversing all nodes in a secure domain of a network.

BACKGROUND OF THE INVENTION

Traditional encryption on the Internet, such as that provided by Internet Protocol Security (IPsec), a protocol suite for securing Internet Protocol (IP) communications by authenticating and encrypting each IP packet of a communication session and which also includes protocols for establishing mutual authentication between agents at the beginning of the session and negotiation of cryptographic keys to be used during the session, is intended for providing users with security for sensitive data and applications. IPsec was designed for authenticating and encrypting IP packets between two devices e.g. routers, in a point-to-point fashion by establishing an encryption tunnel between those routers. IPsec was not designed for network level encryption and security between a multitude of routers communicating together and between one another simultaneously without establishing a full mesh of IPSec tunnels between routers. Creating full meshes of IPSec tunnels for inter-nodal encrypted traffic is cumbersome and inefficiently uses network and router precious resources. IPSec and other prior art solutions also do not provide encryption and authentication security for IP/MPLS control plane traffic (such as OSPF, BGP, RIP, RSVP-TE, LDP, and similar protocols) used in an IP/MPLS network to establish routing and signaling between nodes.

Commonly used encryption standards include: DES (Data Encryption Algorithm); 3DES (Triple Data Encryption Algorithm); Blowfish (Blowfish symmetric key block cipher standard); Twofish (Twofish symmetric key block cipher standard); Serpent (Serpent symmetric key block cipher standard); SNOW 3G (SNOW stream cipher standard); Kasumi-F8 (Kasumi-F8 block cipher); AES-128 (Advanced Encryption Standard 128 bit key); AES-192 (Advanced Encryption Standard 192 bit key); and AES-256) Advanced Encryption Standard 256 bit key).

The US Congress and Senate are requiring utility companies to expand investment in cyber-security to protect the evolving "Smart Grid". As well, North American Electric Reliability Corporation (NERC) Standards defined national standards for security through NERC-CIP (NERC Critical Infrastructure Protection) requirements, of which encryption/authentication is an important aspect. Likewise, similar requirements are appearing worldwide for corresponding applications, for example, specifications and requirements through the IEC (International Electrotechnical Commission).

It would be useful to have an efficient method which could encrypt all routable IP packets traversing the network including user and control plane traffic using a single method for both types of traffic, where IP routing is maintained for individual traffic flows as would be expected before encryption and authentication was applied.

SUMMARY OF THE INVENTION

It is an object of the invention to provide an efficient method of encrypting all IP packets traversing the network including user and control plane traffic using a single method for both types of traffic, where IP routing is maintained for individual traffic flows as would be expected before encryption and authentication was.

According to a first aspect of the invention there is provided a method of encrypting data for a network having a plurality of network elements, each of the plurality of network elements having a connection between a respective ingress interface to a respective egress interface of another network element of the plurality of network elements; and a subset of the plurality of network elements having a secured domain; the method having the steps of: at a first network element which is a member of the subset of network elements, encrypting all Layer 3 packets that were received on an ingress interface that had encryption disabled on that interface as they egress an egress interface wherein the egress interface is enabled for encryption; at the first network element, unencrypting all Layer 3 packets as they egress an egress interface wherein the egress interface is not enabled for encryption and the ingress interface was enabled for encryption; and at the first network element, leaving encrypted all encrypted Layer 3 packets as they egress an egress interface wherein the egress interface is enabled for encryption and the ingress interface where said packets where received was also enabled for encryption.

In some embodiments of this aspect of the invention the encrypting is associated with an encryption protocol that is one of the group of DES, 3DES, Blowfish, Twofish, Serpent, SNOW 3G, Kasumi-F8, AES-128, AES-192, and AES-256.

According to another aspect of the invention there is provided a system for providing a secured domain, having: a plurality of network elements, each of the plurality of network elements having a connection between a respective ingress interface to a respective egress interface of another network element of the plurality of network elements; a subset of the plurality of network elements having the secured domain; a first network element which is a member of the subset of network elements, which encrypts all unencrypted Layer 3 packets as they egress a respective egress interface wherein the egress interface is enabled for encryption; the first network element further unencrypting all encrypted Layer 3 packets as they egress a respective egress interface wherein the egress interface is not enabled for encryption; and the first network element leaving encrypted all encrypted Layer 3 packets as they egress a respective egress interface wherein the egress interface is enabled for encryption.

In some embodiments of this aspect of the invention the encrypting is associated with an encryption protocol that is one of the group of DES, 3DES, Blowfish, Twofish, Serpent, SNOW 3G, Kasumi-F8, AES-128, AES-192, and AES-256.

According to yet another aspect of the invention there is provided a non-transitory machine readable storage medium encoded with instructions for execution by a processor at a first network element for a network having a plurality of network elements, each of the plurality of network elements having a connection between a respective ingress interface to a respective egress interface of another network element of the plurality of network elements; and a subset of the plurality of network elements having a secured domain; and the first network element a member of the subset, the medium having: instructions for encrypting all unencrypted Layer 3 packets as they egress an egress interface of the first network element in the event the egress interface is enabled for encryption; instructions for unencrypting all encrypted Layer 3 packets as they egress an egress interface of the first network element in the event the egress interface is not enabled for encryption; and instructions for leaving encrypted all encrypted Layer 3 packets as they egress an egress interface of the first network element in the event the egress interface is enabled for encryption.

In some embodiments of this aspect of the invention the encrypting is associated with an encryption protocol that is one of the group of DES, 3DES, Blowfish, Twofish, Serpent, SNOW 3G, Kasumi-F8, AES-128, AES-192, and AES-256.

Note: in the following the description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

BRIEF DESCRIPTION OF THE DRAWINGS

The present invention will be further understood from the following detailed description of embodiments of the invention, with reference to the drawings in which like reference numbers are used to represent like elements, and:

FIG. 2 illustrates another exemplary network having a secure domain for control plane traffic according to an embodiment of the;

FIG. 3a illustrates an exemplary encrypted Layer 3 packet having an Ethernet header according to an embodiment of the invention;

FIG. 3b illustrates an exemplary encrypted Layer 3 packet having an IP header according to an embodiment of the invention.

DETAILED DESCRIPTION

Figure 1:
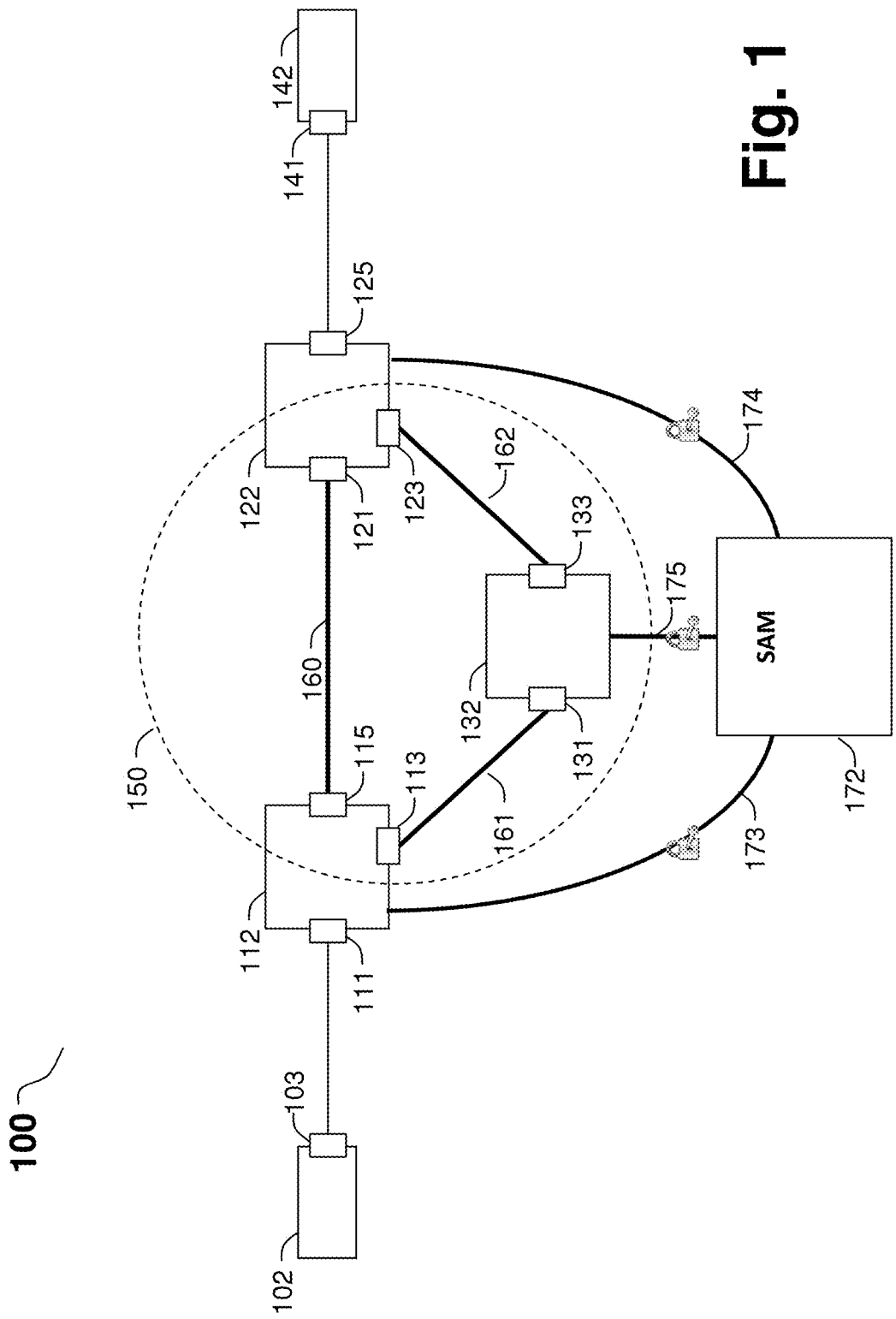
FIG. 1 illustrates an exemplary network having a secure domain for user traffic therein according to an embodiment of the invention

In the following description, numerous specific details are set forth. However, it is understood that embodiments of the invention may be practiced without these specific details. In other instances, well-known circuits, structures and techniques have not been shown in detail in order not to obscure the understanding of this description. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, cooperate or interact with each other. "Connected" is used to indicate the establishment of communication between two or more elements that are coupled with each other.

The techniques shown in the figures can be implemented using code and data stored and executed on one or more electronic devices (e.g., a network element). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Customer computer end stations (e.g., workstations, laptops, palm tops, mobile phones, etc.) access content/services provided over the Internet and/or content/services provided on associated networks such as the Internet. The content and/or services are typically provided by one or more server computing end stations belonging to a service or content provider, and may include public webpages (free content, store fronts, search services, etc.), private webpages (e.g., username/password accessed webpages providing email services, etc.), corporate networks over VPNs, etc. Typically, customer computing end stations are coupled (e.g., through customer premise equipment coupled to an access network, wirelessly to an access network) to edge network elements, which are coupled through core network elements of the Internet to the server computing end stations.

In general in the description of the figures, like reference numbers are used to represent like elements.

Referring now to FIG. 1 wherein there may be seen a network 100 having network nodes 102, 112, 122, 132, and 142. The network nodes are connected via interfaces 103 on network node 102; interfaces 111, 113, and 115 on network node 112; interfaces 121, 123, and 125 on network node 122;

interfaces 131, and 133 on network node 132; and interface 141 on network node 142. Interfaces may either be enabled for encryption-plus-authentication or disabled for encryption-plus-authentication. Bold links 160, 161, and 162 between interfaces are enabled for encryption-plus-authentication and un-bolded links are not enabled for encryption-plus-authentication, namely the links connecting interfaces 103 and 111, and interfaces 125 and 141. Interfaces 103, 111, 125 and 141 are not enabled for encryption-plus-authentication, while interfaces, 113, 115, 121, 123, 131, and 133 are enabled for encryption-plus-authentication. Interface 103 connects to interface 111; interface 113 connects to interface 131; interface 115 connects to interface 121; interface 133 connects to interface 123; and interface 125 connects to interface 141.

Boundary contour 150 indicates the extent of the secured and encrypted domain within network 100, namely the domain consisting of the encrypted interfaces 113 and 115 on network node 112 and its internal routing function, the encrypted interfaces 121 and 123 on network node 122 and its internal routing function, and interfaces 131 and 133 on network node 132 and its internal routing function.

In operation, communication within the secured domain is encrypted, whereas communication outside the domain boundary is unencrypted. Communication that crosses the security boundary 150 changes the encryption status of the packet using the encryption scheme adopted within the secure domain boundary. This is effected by, first configuring the interfaces so that they are either enabled for encryption or not enabled for encryption. Routing information already available on the node is then used to determine when:

1) a packet is to be forwarded from an ingress interface disabled for encryption to an egress interface disabled for encryption, implying the packet is to remain outside the security domain boundary and no encryption or un-encryption operations will be applied to the packet.

2) a packet is to be forwarded from an ingress interface disabled for encryption to an egress interface enabled for encryption, implying the packet is to cross the security domain boundary from the unsecure domain to the secure domain and will require the node to apply the encryption scheme (encrypt) to the packet before forwarding out the egress interface.

3) a packet is to be forwarded from an ingress interface enabled for encryption to an egress interface disabled for encryption, implying the packet is to cross the security domain boundary from the secure domain to the unsecure domain and will require the node to remove the encryption scheme (unencrypt) from the packet before forwarding out the egress interface.

4) a packet is to be forwarded from an ingress interface enabled for encryption to an egress interface also enabled for encryption, implying the packet is already encryption within the security domain boundary and will remain within the domain and no encryption or un-encryption operation will be applied to the packet.

By way of example, using the network nodes depicted in FIG. 1 it can be seen that a packet from interface 103 on network node 102 and destined for network node 142 has two possible paths through secure domain 150. The first path is from network node 112 to network node 122 and thence to destination node 142. Via this path, network node 112 receives the packet on interface 111 that is disabled for encryption and proceeds to forward it to egress interface 115. As egress interface 115 is enabled for encryption and connects to interface 121 on another network node within the secure domain, egress interface 115 must encrypt all packets that egress the interface and originated from an interface disabled for encryption. Therefore, according to an embodiment of the invention, network node 112 encrypts the packet from interface 111 and sends the encrypted packet out egress interface 115 towards interface 121 on node 122. Network node 122 receives the encrypted packet on interface 121 which is enabled for encryption, recognizes from routing information that the destination node is network node 142 and prepares to forward it via the encryption disabled egress interface 125. Egress interface 125 is not enabled for encryption as it and node 142 are outside of the secure domain. Therefore the node 122 recognizes this transition from the secure domain to the unsecure domain, unencrypts the packet and then forwards it out interface 125 towards node 142 where it is received on interface 141 by network node 142.

The second path from network node 102 to destination node 142 is via, in sequence, secure domain network nodes 112, 132, and 122. Via this path, network node 112 receives the packet on interface 111 that is disabled for encryption and proceeds to forward it to egress interface 113. As egress interface 113 is enabled for encryption and connects to interface 131 on another network node within the secure domain, egress interface 113 must encrypt all packets that egress the interface and originated from an interface disabled for encryption. Therefore, according to an embodiment of the invention, network node 112 encrypts the packet from interface 111 and sends the encrypted packet out egress interface 113 towards interface 131 on node 132. Network node 132 receives the packet at encryption enabled interface 131 and proceeds to forward it via encryption enabled interface 133 towards interface 123 on network node 122. Since network node 132 recognizes the packet as being received on encrypted interface 131, node 132 knows the packet has already been encrypted and checks for encryption on the packet's receipt to verify that is true. If not true then packet may be an intruder packet and must be dropped. If true, then the packet can be forwarded. Node 132 then recognizes the egress interface 133 is also enabled for encryption and thus merely forwards the packet out interface 133 leaving the existing encryption scheme used on the packet in place. Network node 122 receives the encrypted packet on encryption enabled interface 123, recognizes from routing information that the destination node is network node 142 and determines it must forward the packet via encryption disabled egress interface 125. Since, egress interface 125 is not enabled for encryption as it is connected to a node outside of the secure domain, node 122 therefore unencrypts the packet before forwarding and then forwards it out encryption disabled interface 125 towards node 142 where it is received on interface 142.

Thus, dependent upon the encryption enablement of the ingress and egress interfaces, the egress interface will either encrypt and forward the packet, unencrypt and forward the packet, or leave the packet either encrypted or unencrypted as originally received and forward it as is.

In operation all the network nodes within the secure domain share the encryption and authentication key information. The encryption and authentication key information is forwarded and stored at the nodes. The particular encryption key in use on a particular packet is indicated by the SPID contained in the header portion of the packet.

Referring again to FIG. 1, there may be seen Service Aware Manager 172 which is connected to network element 111 by secure communication link 173, to network element 122 by secure communication link 174, and to network element 132 by secure communication link 175 respectively. Communication links 173, 174 and 175 may be effected by any appropriate secure protocol, for example Secure Shell (SSH) protocol. Service Aware Manager 172 provides network elements 112, 122, and 132 the encryption label used to identify packets that have been encrypted. The encryption label is a network wide label value that is recognized by all nodes to identify encrypted packets on reception and to indicate encryption of packets on transmissions. It also provides network elements 112, 122, and 132 the necessary encryption and authentication keys required to coordinate encrypted communications between SDPs.

The encryption of Layer 3 traffic ensures that the user plane data is protected; that the network topology cannot be discovered by an attacker (via encrypting Internet Gateway Protocol (IGP) messages such as that of IS-IS (Intermediate System to Intermediate System) and OSPF (Open Shortest Path First); and that signaling and synchronization protocols cannot be attacked (including RSVP (Resource Reservation Protocol) and T-LDP (Targeted Label Distribution Protocol) messaging.

Figure 2:
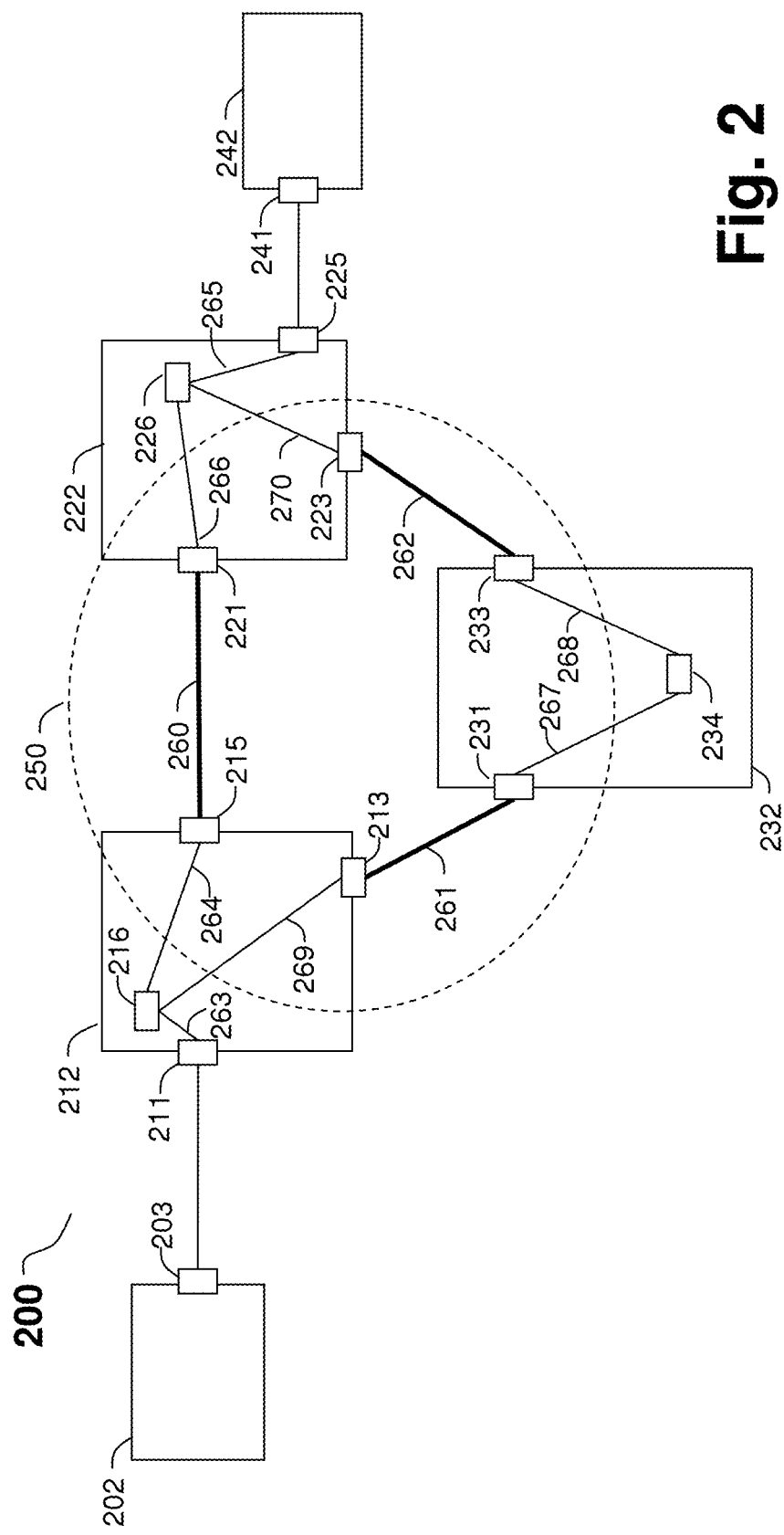

Referring to FIG. 2 wherein there may be seen a network 200 having network nodes 202, 212, 222, 232, and 242. The network nodes communicate control plane traffic with one another via connected interfaces 203 on network node 202; interfaces 211, 213, and 215 on network node 212; interfaces 221, 223, and 225 on network node 222; interfaces 231, and 233 on network node 232; and interface 241 on network node 242. Interfaces may either be enabled for encryption-plus-authentication or disabled for encryption-plus-authentication. Bold links 260, 261, and 262 between interfaces are enabled for encryption-plus-authentication and un-bolded links between nodes are not enabled for encryption-plus-authentication. Interfaces 203 and 241 are not enabled for encryption-plus-authentication, while interfaces 211, 213, 215, 221, 223, 231, and 233 are enabled for encryption-plus-authentication. Interface 203 connects to interface 211; interface 213 connects to interface 231; interface 215 connects to interface 221; interface 233 connects to interface 223; and interface 225 connects to interface 241.

Boundary contour 250 indicates the extent of the secured domain within network 200, namely the domain consisting of the encrypted interfaces 213 and 215 on network node 212 and its internal routing function, the encrypted interfaces 221 and 223 on network node 222 and its internal routing function, and interfaces 231 and 233 on network node 232 and its internal routing function.

Within network nodes 212, 222, and 232 may be seen control processors 216, 226 and 234 respectively, which represent the processing elements of each node that process control plane packets. The control processors 216, 226 and 234 are shown outside of secure domain 250 as they process unencrypted data. Links 263, 269, and 264 show the connection between control processor 216 and interface 211, 213 and 215 respectively. Likewise links 265, 270, and 266 show the connection between control processor 226 and interface 221, 223 and 225 respectively. As well, links 267 and 268 show the connection between control processor 234 and interface 231 and 235 respectively.

Referring to FIG. 3a there may be seen a Layer 3 encrypted packet having an Ethernet header according to an embodiment of the invention. Packet segment 301 contains the Ethernet header, and packet segment 302 contains the IP data. Packet segment 303 contains the ESP/AH (Encapsulating Security Payload/Authentication Header) data. Packet segment 304 contains the encrypted payload, including data segment 305, and packet segment 306 contains the authentication data.

Referring to FIG. 3b there may be seen a Layer 3 encrypted packet having an IP header according to an embodiment of the invention. Packet segment 311 contains the IP header, and packet segment 312 contains the SPI (Security Parameter Index) data. Packet segment 313 contains the sequence number. In this packet, packet segments 312 and 313 comprise the ESP (Encapsulating Security Payload) header. Packet segment 314 contains the encrypted payload, including data segment 315. Packet segment 316 contains the authentication data.

Figure 4:
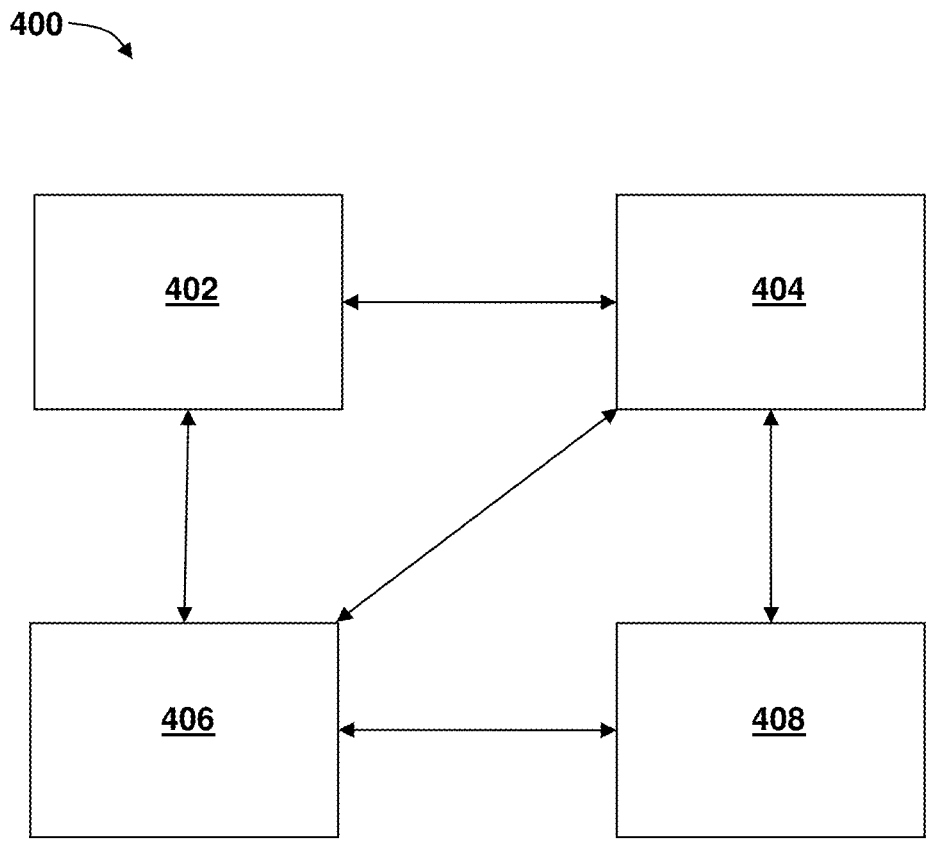
FIG. 4 illustrates a block diagram of a network equipment processor assembly according to an embodiment of the invention.

Referring now to FIG. 4, a network equipment processor assembly 400 which in certain embodiments may be used in the handling of packets, includes a network equipment processor element 406 (e.g., a central processing unit (CPU) and/or other suitable processor(s)), a memory 408 (e.g., random access memory (RAM), read only memory (ROM), and the like), a cooperating module/process 402, and various input/output devices 404 (e.g., a user input device (such as a keyboard, a keypad, a mouse, and the like), a user output device (such as a display, a speaker, and the like), an input port, an output port, a receiver, a transmitter, and storage devices (e.g., a tape drive, a floppy drive, a hard disk drive, a compact disk drive, and the like)).

It will be appreciated that the functions depicted and described herein may be implemented in hardware, for example using one or more application specific integrated circuits (ASIC), and/or any other hardware equivalents. Alternatively, according to one embodiment, the cooperating process 402 can be loaded into memory 408 and executed by network equipment processor 406 to implement the functions as discussed herein. As well, cooperating process 402 (including associated data structures) can be stored on a tangible, non-transitory computer readable storage medium, for example magnetic or optical drive or diskette, semiconductor memory and the like.

It is contemplated that some of the steps discussed herein as methods may be implemented within hardware, for example, as circuitry that cooperates with the network equipment processor to perform various method steps. Portions of the functions/elements described herein may be implemented as a computer program product wherein computer instructions, when processed by a network equipment processor, adapt the operation of the network equipment processor such that the methods and/or techniques described herein are invoked or otherwise provided. Instructions for invoking the inventive methods may be stored in fixed or removable media, and/or stored within a memory within a computing device operating according to the instructions.

Therefore what has been disclosed is a method for encrypting all user and control plane traffic traversing nodes in a network.

Note, in the preceding discussion a person of skill in the art would readily recognize that steps of various above-described methods can be performed by appropriately configured network processors. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices are all tangible and non-transitory storage media and may be, e.g., digital memories, magnetic storage media such as a magnetic disks and magnetic tapes, hard drives, or optically readable digital data storage media. The embodiments are also intended to cover network element processors programmed to perform said steps of the above-described methods.

Numerous modifications, variations and adaptations may be made to the embodiment of the invention described above without departing from the scope of the invention, which is defined in the claims.

What is claimed is:

1. A method of encrypting data for a network having a plurality of network elements, each of said plurality of network elements having a connection between a respective ingress interface to a respective egress interface of another network element of said plurality of network elements, and a subset of said plurality of network elements comprising a secured domain, the method comprising:
- at a first network element, which is a member of said subset of network elements and inside the secured domain, encrypting all unencrypted Layer 3 packets as they egress the respective egress interface, wherein said egress interface is enabled for encryption;
- at said first network element, unencrypting all encrypted Layer 3 packets as they egress the respective egress interface, wherein said egress interface is not enabled for encryption and is outside the secured domain; and
- at said first network element, leaving encrypted all encrypted Layer 3 packets as they egress the respective egress interface, wherein said egress interface is enabled for encryption.

2. The method as claimed in claim 1, wherein said encrypting is associated with an encryption protocol that is one of a group of DES, 3DES, Blowfish, Twofish, Serpent, SNOW 3G, Kasumi-F8, AES-128, AES-192, and AES-256.

3. A system for providing a secured domain, comprising:
- a plurality of network elements, each of said plurality of network elements having a connection between a respective ingress interface to a respective egress interface of another network element of said plurality of network elements;
- a subset of said plurality of network elements comprising said secured domain;
- a first network element which is a member of said subset of network elements and inside the secured domain, which encrypts all unencrypted Layer 3 packets as they egress the respective egress interface, wherein said egress interface is enabled for encryption;
- said first network element further unencrypting all encrypted Layer 3 packets as they egress the respective egress interface, wherein said egress interface is not enabled for encryption and is outside the secured domain; and
- said first network element leaving encrypted all encrypted Layer 3 packets as they egress the respective egress interface, wherein said egress interface is enabled for encryption.

4. The system as claimed in claim 3, wherein said encrypting is associated with an encryption protocol that is one of a group of DES, 3DES, Blowfish, Twofish, Serpent, SNOW 3G, Kasumi-F8, AES-128, AES-192, and AES-256.

5. A non-transitory machine readable storage medium encoded with instructions for execution by a processor at a first network element for a network having a plurality of network elements, each of said plurality of network elements having a connection between a respective ingress interface to a respective egress interface of another network element of said plurality of network elements, and a subset of said plurality of network elements comprising a secured domain, and said first network element a member of said subset and inside the secured domain, the medium comprising:
- instructions for encrypting all unencrypted Layer 3 packets as they egress the respective egress interface of said first network element when said egress interface is enabled for encryption;
- instructions for unencrypting all encrypted Layer 3 packets as they egress the respective egress interface of said first network element when said egress interface is not enabled for encryption and is outside the secured domain; and
- instructions for leaving encrypted all encrypted Layer 3 packets as they egress the respective egress interface of said first network element when said egress interface is enabled for encryption.

6. The non-transitory machine readable storage medium as claimed in claim 3, wherein said encrypting is associated with an encryption protocol that is one of a group of DES, 3DES, Blowfish, Twofish, Serpent, SNOW 3G, Kasumi-F8, AES-128, AES-192, and AES-256.

* * * * *